United States Patent
Sheem et al.

(10) Patent No.: US 8,048,568 B2
(45) Date of Patent: Nov. 1, 2011

(54) NEGATIVE ACTIVE MATERIAL FOR RECHARGEABLE LITHIUM BATTERY AND RECHARGEABLE LITHIUM BATTERY

(75) Inventors: Kyou-Yoon Sheem, Ohsan (KR); Keiko Matsubara, Yokohama (JP); Toshiaki Tsuno, Yokohama (JP); Akira Takamuku, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 1205 days.

(21) Appl. No.: 10/752,297

(22) Filed: Jan. 6, 2004

(65) Prior Publication Data

US 2004/0197660 A1    Oct. 7, 2004

(30) Foreign Application Priority Data

Jan. 6, 2003  (JP) ................................. 2003-000447
Jan. 5, 2004  (KR) ......................... 10-2004-0000263

(51) Int. Cl.
  *H01M 4/58* (2010.01)
(52) U.S. Cl. ................................................ 429/231.95
(58) Field of Classification Search ............... 429/231.95
  See application file for complete search history.

(56) References Cited

U.S. PATENT DOCUMENTS

| | | | |
|---|---|---|---|
| 6,235,427 B1 * | 5/2001 | Idota et al. | 429/218.1 |
| 6,432,585 B1 * | 8/2002 | Kawakami et al. | 429/233 |

FOREIGN PATENT DOCUMENTS

| | | |
|---|---|---|
| JP | 60-078635 | 5/1985 |
| JP | 62-269743 | 11/1987 |
| JP | 01-265450 | 10/1989 |
| JP | 03-159069 | 7/1991 |
| JP | 03-236157 | 10/1991 |
| JP | 09-111316 | 4/1997 |
| JP | 10-003920 | 1/1998 |
| JP | 10003920 A * | 1/1998 |
| JP | 10-045409 | 2/1998 |
| JP | 2000-012015 | 1/2000 |
| JP | 2002-83594 | 3/2002 |
| JP | 2004-213927 | 7/2004 |

OTHER PUBLICATIONS

Patent Abstracts of Japan for Publication No. 03-159069; Date of publication of application Jul. 9, 1991, in the name of Noda Tomohiko et al.
Patent Abstracts of Japan for Publication No. 03-236157; Date of publication of application Oct. 22, 1991, in the name of Ido Shuichi et al.
Patent Abstracts of Japan for Publication No. 10-003920; Date of publication of application Jan. 6, 1998, in the name of Satou Asako et al.
Patent Abstracts of Japan for Publication No. 01-265450; Date of publication of application Oct. 23, 1989, in the name of Teraoka Hirokimi et al.

(Continued)

*Primary Examiner* — Karie O'Neill Apicella
(74) *Attorney, Agent, or Firm* — Christie, Parker & Hale, LLP

(57) ABSTRACT

Disclosed is a negative active material for a rechargeable lithium battery including ultra-fine particles comprising an element which is capable of alloying with lithium. The particles have a diameter of 1 nm to 200 nm, a Raman shift of 480 $cm^{-1}$ to 520 $cm^{-1}$ measured by Raman Spectroscopy, and a full width at half-maximum of 10 $cm^{-1}$ to 30 $cm^{-1}$.

6 Claims, 3 Drawing Sheets

OTHER PUBLICATIONS

Patent Abstracts of Japan for Publication No. 09-111316; Date of publication of application Apr. 28, 1997, in the name of Goto Akihiro.

Patent Abstracts of Japan for Publication No. 10-045409; Date of publication of application Feb. 17, 1998, in the name of Nakanishi Takeshi et al.

Patent Abstracts of Japan for Publication No. 60-078635; Date of publication of application May 4, 1985, in the name of Oda Masaaki.

Patent Abstracts of Japan for Publication No. 62-269743; Date of publication of application Nov. 24, 1987, in the name of Hayashi Chikara.

Patent Abstracts of Japan for Publication No. 2004-213927; Date of publication of application Jul. 29, 2004, in the name of Senna Tamotsu et al.

Patent Abstracts of Japan for Publication No. 2000-012015; Date of publication of application Jan. 14, 2000, in the name of Yum Yan et al.

Patent Abstract of Japan, Publication No. 2002-083594, Published on Mar. 22, 2002, in the name of Ikeda, et al.

* cited by examiner

NEGATIVE ACTIVE MATERIAL FOR RECHARGEABLE LITHIUM BATTERY AND RECHARGEABLE LITHIUM BATTERY

CROSS REFERENCE TO RELATED APPLICATION

This application claims priority of Japanese application No. 2003-447 filed in the Japan Patent Office on Jan. 6, 2003 and Korean application No. 2004-263 filed in the Korean Intellectual Property Office on Jan. 5, 2004, the entire disclosures of which are incorporated hereinto by reference.

FIELD OF THE INVENTION

The present invention relates to a negative active material for a rechargeable lithium battery and a rechargeable lithium battery comprising the same, and more particularly, to a negative active material for a rechargeable lithium battery exhibiting good cycle life characteristics.

BACKGROUND OF THE INVENTION

Although research to develop a negative active material having a high capacity based on metallic materials such as Si, Sn, and Al has actively been undertaken, such research has not yet succeeded in applying metals to a negative active material. This is mainly due to problems with the deterioration of the cycle life characteristics as a result of alloying of the metallic materials such as Si, Sn, and Al with lithium during charge and discharge, because the alloy expands and contracts in volume, which produces excessively small micro-particles.

In order to attempt to solve these problems, an amorphous or micro-crystalline Si foil obtained from CVD and a sputtering procedure as a negative active material metal has been suggested in Japanese Patent Laid-Open Publication No. 2002-83594. The amorphous Si does not convert into micro-particles and gives improved cycle life characteristics during repeated charge and discharge, because the volume expansion of an alloy of the amorphous Si and lithium is smaller than that of a crystalline Si.

However, a larger capacity than the conventional graphite negative electrode requires a thick Si foil which requires a long formation time and high cost, and decreases conductivity, deteriorating battery performance.

Thus, the bulk crystalline Si is pulverized through mechanical pulverization under a high shear force, so that the crystalline lattice of Si is distorted to convert it into an amorphous state and to minimize an average diameter thereof, thereby obtaining amorphous Si powder.

The amorphous Si powder, however, has a wide diameter distribution between about several hundred nm to 1 μm, and the macro particles at about 1 μm deteriorate the cycle life characteristics because they are severely expanded and contracted which minimizes particle size during the charge and discharge.

It has also been attempted to use a mixture of mechanically pulverized Si powder and graphite. However, the mechanically pulverized Si powder has a wide diameter distribution, and it contains macro particles with a diameter of 1 μm in which volume expansion and shrinkage largely occurs, resulting in the deterioration of the negative electrode.

SUMMARY OF THE INVENTION

It is an aspect of the present invention to provide a negative active material for a rechargeable lithium battery in which volume expansion and contraction does not occur.

It is another aspect of the present invention to provide a negative active material exhibiting good cycle life characteristics.

It is still another aspect of the present invention to provide a rechargeable lithium battery including the novel negative active material.

These and other objects may be achieved by a negative active material for a rechargeable lithium battery having a diameter of 1 nm to 200 nm, a Raman shift of 480 $cm^{-1}$ to 520 $cm^{-1}$ measured by Raman Spectroscopy, and a full width at half-maximum of 10 $cm^{-1}$ to 30 $cm^{-1}$, and including micro-particles including an element which is capable of alloying with lithium. Preferably, the element is Si.

The negative active material includes micro-particles obtained from an evaporation procedure under a gas atmosphere, and the micro-particles have a narrow diameter distribution of between 1 and 200 nm and a maximum diameter of 200 nm. The narrow diameter distribution for the micro-particles causes them to have a different crystalline structure from Si. An alloy formed from the micro-particles and lithium does not expand during charge and discharge, thereby exhibiting good cycle life characteristics.

The micro-particles include at least one of isolated micro-particles, linear-linked micro-particles, and agglomerated micro-particles. The isolated micro-particles, linear-linked micro-particles, and agglomerated micro-particles preferably have a diameter of 1 to 200 nm.

The negative active material has a Raman Shift of 480 $cm^{-1}$ to 520 $cm^{-1}$ measured by Raman Spectroscopy, and a full width at half-maximum of 10 $cm^{-1}$ to 30 $cm^{-1}$. The negative active material has an amorphous form. These physical properties help prevent volume expansion during charge and discharge, and improvement of the cycle life characteristics.

The present invention also provides a rechargeable lithium battery including the negative active material.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

A negative active material of the present invention is obtained from an evaporation process under a gas atmosphere, and includes micro-particles of an element which is capable of alloying with lithium. The negative active material micro-particles have a diameter of 1 nm to 200 nm. Preferred elements include Si, Pb, Al, and Sn, and most preferably Si.

When a rechargeable lithium battery including the negative active material is charged, lithium transfers from a positive electrode to the negative electrode to form an alloy of lithium and the micro-particles in the negative electrode. The alloyed micro-particles do not cause expansion of the volume thereof, thereby improving the cycle life characteristics.

The reason the volume expansion does not occur is the very small diameter and the narrow diameter distribution for the micro-particles.

Figure 1:
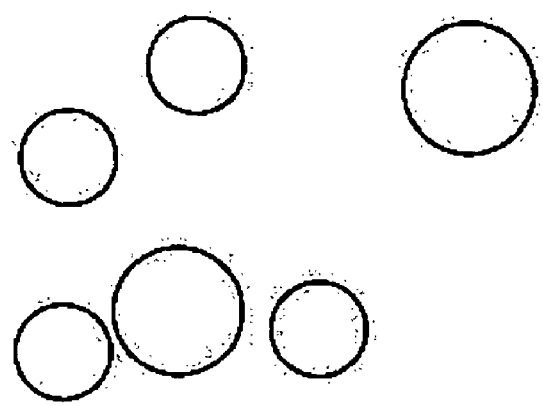
FIG. 1 is a schematic diagram showing micro-particles included in a negative active material according to one embodiment of the present invention.
Figure 2:
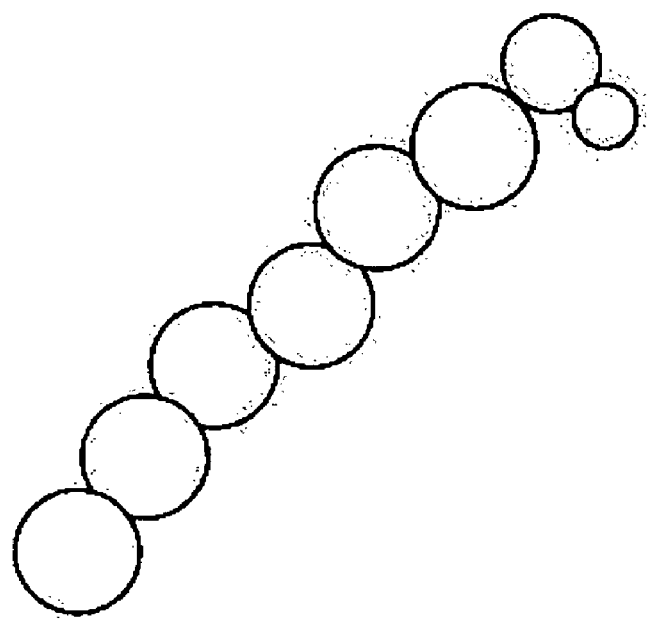
FIG. 2 is a schematic diagram showing micro-particles included in a negative active material according to another embodiment of the present invention, as a side (perspective) view.
Figure 3A:
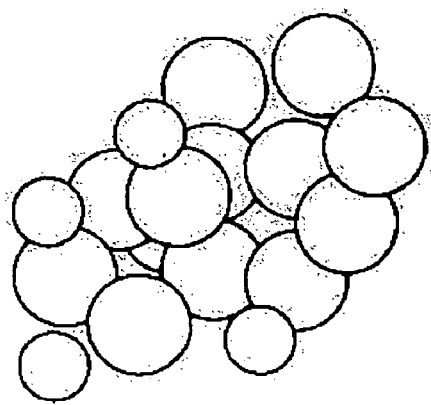
FIGS. 3(a) and 3(b) are schematic diagrams showing micro-particles included in a negative active material according to other embodiments of the present invention.
Figure 3B:
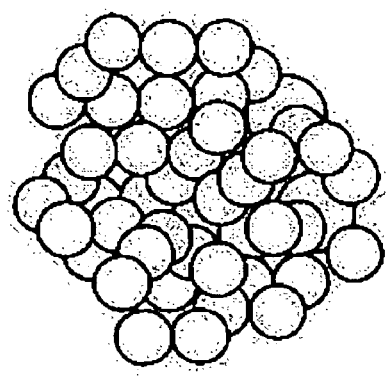

The micro-particles have several forms, such as isolated micro-particles as shown in FIG. 1, linear-linked micro-particles as shown in FIG. 2, or agglomerated micro-particles as shown in FIGS. 3($a$) and 3($b$). The isolated micro-particles consist of single particles, but the linear-linked and agglomerated micro-particles consist of a plurality of nano-particles. As shown in FIGS. 2, 3($a$), and 3($b$), it is unnecessary for the nano-particles to have the same diameter. The negative active material of the present invention includes at least one of isolated micro-particles, linear-linked micro-particles, and agglomerated micro-particles.

The micro-particles preferably have a diameter of 1 to 200 nm, regardless of their form. The diameter is the length in the direction of linear-linking in the linear-linked micro-particles, and in the agglomerated micro-particle the diameter is defined as the largest diameter thereof.

The isolated micro-particles, the linear-linked micro-particles, and the agglomerated micro-particles do not cause volume expansion because they have a narrow particle distribution and a very small particle size.

The negative active material preferably has a Raman Shift of 480 $cm^{-1}$ to 520 $cm^{-1}$ measured by Raman Spectroscopy, and a full width at half-maximum of 10 $cm^{-1}$ to 30 $cm^{-1}$.

Generally, a Raman Shift is lower for amorphous material than for crystalline material. For example, crystalline Si has a Raman Shift of over 520 $cm^{-1}$, and amorphous Si has a lower shift. In addition, the peak is broader for amorphous Si compared to crystalline Si. The physical properties help prevent volume expansion and improve the cycle life characteristics.

Alternatively, as the negative active material, a material is obtained by attachment of the micro-particles to a graphite surface.

According to one embodiment of the present invention, a rechargeable lithium battery includes a negative electrode with the negative active material described, a positive electrode, and an electrolyte.

The negative electrode may be produced, for example, by solidifying the negative active material of the aggregate into a sheet shape by adding a binder. The binder binds the aggregate of ultra-fine particles. The aggregate may be solidified into a pellet having a columnar, discoid, lamellar, or cylindrical shape.

While the binder may be composed of either an organic or an inorganic material, it should be distributed and dissolved in a solvent together with the micro-particles, and bind each of the micro-particles after removing the solvent. Alternatively, it may be one capable of being solidified by, for example, press solidification, together with the ultra-fine particles, and binding each into the aggregate. Such binders may include a vinyl-based resin, a cellulose-based resin, a phenyl resin, a thermoplastic resin, a thermosetting resin, or similar binders. Specific examples include polyvinylidene fluoride, polyvinylalcohol, carboxymethyl cellulose, or butylbutadiene rubber.

The negative electrode of the present invention may further include a conductive agent such as carbon black, in addition to the negative active material and the binder.

The positive electrode may include a positive active material capable of intercalating and deintercalating lithium ions. Positive active materials may be exemplified as organic disulfide compounds and organic polysulfide compounds such as $LiMn_2O_4$, $LiCoO_2$, $LiNiO_2$, $LiFeO_2$, $V_2O_5$, TiS, and MoS.

The positive electrode may further include a binder such as polyvinylidene fluoride, and a conductive agent such as carbon black.

The positive electrode and the negative electrode may be fabricated by coating the positive electrode or the negative electrode on a current collector of a metal foil to form a sheet.

The electrolyte may include an organic electrolyte capable of dissolving the lithium salt in a non-protonic solvent. The non-protonic solvent may include, but is not limited to, propylene carbonate, ethylene carbonate, butylene carbonate, benzonitrile, acetonitrile, tetrahydrofuran, 2-methyl tetrahydrofuran, γ-butyrolactone, dioxolan, 4-methyl dioxolan, N,N-dimethyl formamide, dimethyl acetamide, dimethyl sulfoxide, dioxane, 1,2-dimethoxyethane, sulfolane, dichloroethane, chlorobenzene, nitroheptane, dimethylcarbonate, methyl ethyl carbonate, diethylcarbonate, methylpropyl carbonate, methyl isopropyl carbonate, ethyl butyl carbonate, dipropyl carbonate, diisopropyl, carbonate, dibutyl carbonate, diethylene glycol, dimethyl ether, or mixtures thereof. Preferably, it includes any one of propylene carbonate, ethylene carbonate (EC), butylene carbonate, dimethyl carbonate (DMC), methylethyl carbonate (MEC), or diethyl carbonate (DEC).

Useful lithium salts include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl, or Lil, or a mixture thereof, and preferably $LiPF_6$ or $LiBF_4$.

In addition, the electrolyte may include any conventional organic electrolyte known for fabricating a lithium battery.

The electrolyte may also include a polymer electrolyte in which the lithium salt is mixed with a polymer such as PEO or PVA, or one in which an organic electrolyte is impregnated in a high-swelling polymer.

According to the present invention, the lithium rechargeable battery may further include any other material, as required, in addition to the positive electrode, the negative electrode, and the electrolyte. For example, a separator separating the positive electrode from the negative electrode may be included.

The negative active material according to one embodiment of the present invention may be obtained from an evaporation procedure under a gas atmosphere. The evaporation procedure includes injecting an inert gas into a vacuum bath and colliding an evaporated molecule against the inert gas molecule. The evaporated molecule is obtained from evaporation or sublimation by heating various materials. The resulting material is slowly cooled, thereby aggregating the molecules to obtain micro-particles powder and to recover them.

According to one embodiment of present invention, the inert gas is injected into a vacuum bath under a pressure of $1\times10^{-3}$ Pa to $1\times10^{-4}$ Pa. Thereafter, Si is evaporated by heating a silicon ingot or silicon powder through arc discharge under the inert gas atmosphere, which is controlled to a back pressure of $1\times10^{-4}$ Pa to $5\times10^6$ Pa. The evaporated silicon molecules collide with the inert gas molecules and are slowly cooled. At this time, the molecules are aggregated to form ultra fine particles and to recover them.

The inert gas may be argon, helium, or other gases such as nitrogen which do not react with silicon.

The heating procedure may be performed by arc discharge, inductive heating, laser heating, resistance heating or electron gun heating. Generally, the heating temperature is set to 100 to 200° C. higher than the melting point of the material to be heated. If the temperature is lower, it is difficult to evaporate, and if the temperature is higher, amorphous material cannot be appropriately formed because cooling is difficult. For Si, the heating temperature is preferably 1550 to 1700° C.

Such a slow cooling process allows formation of amorphous silicon in which silicon molecules are disorderly aggregated. The amorphous silicon has a diameter of 1 nm to 200 nm, a Raman Shift of 480 $cm^{-1}$ to 520 $cm^{-1}$, and a full width at half-maximum of 10 $cm^{-1}$ to 30 $cm^{-1}$.

Figure 4:
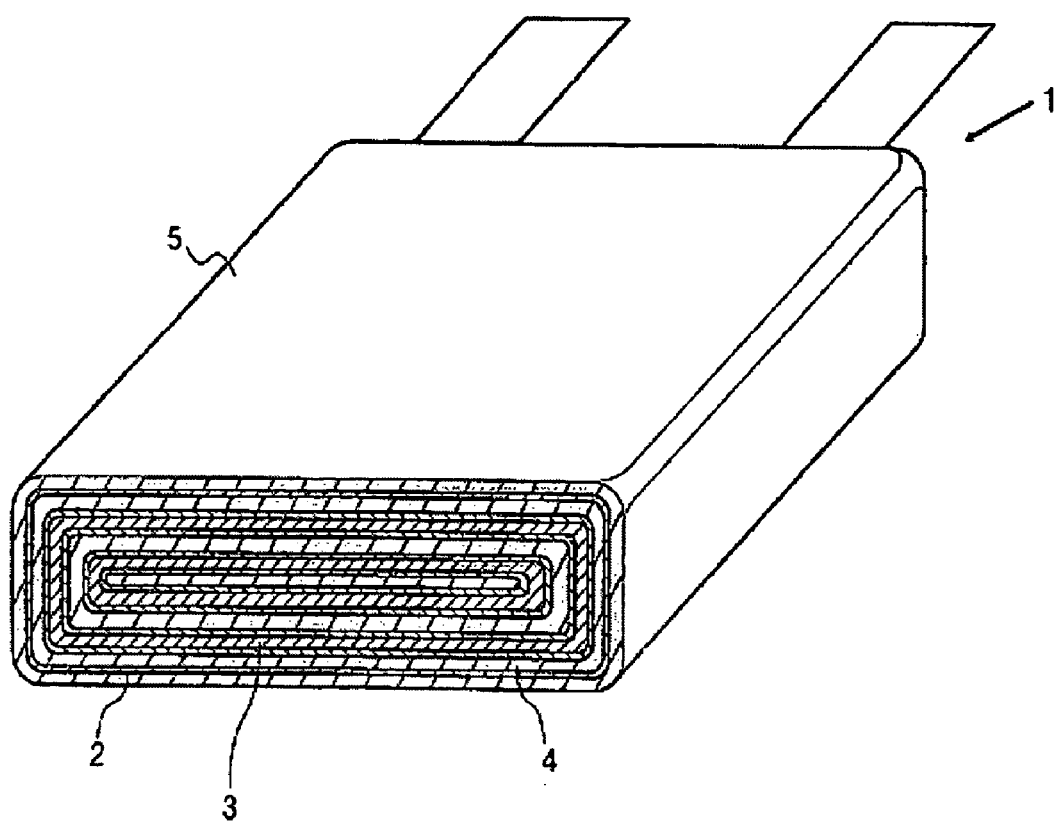
FIG. 4 illustrates a battery made according to the present invention.

An example of a lithium-sulfur battery according to the invention is shown in FIG. 4. The lithium-sulfur battery 1 includes a positive electrode 3, a negative electrode 4, and a separator 2 interposed between the positive electrode 3 and the negative electrode 4. The positive electrode 3, the negative electrode 4, and the separator 2 are contained in a battery case 5. The electrolyte is present between the positive electrode 3 and the negative electrode 4.

The following examples further illustrate the present invention in detail, but are not to be construed to limit the scope thereof.

Preparation of Negative Active Material

Example 1

Silicon which was previously presented in a vacuum bath was heated to 1700° C. through arc heating under a helium atmosphere of 5×10$^4$ Pa to generate silicon atmosphere. The generated silicon atmosphere was cooled under the helium atmosphere to aggregate and to form ultra-fine particles. The ultra-fine particles were adhered on an inner surface of the vacuum bath. The procedure was continuously performed for 4 hours to prepare Si ultra-fine particles as a negative active material.

Diameters of the obtained particles were measured using an electronic microscope, and found to be 10 nm to 200 nm, and they were seen to be configured as the isolated ultra-fine particles as shown in FIG. 1, the linear-linked ultra-fine particles as shown in FIG. 2, and the agglomerated ultra-fine particles as shown in FIG. 3. A Raman shift by Raman Spectroscopy showed a peak at about 500 $cm^{-1}$ and a full width at half-maximum of 15 $cm^{-1}$.

Comparative Example 1

Silicon macro powder with an average diameter of 1 μm was pulverized with a bead mill with zirconia beads for 24 hours to prepare a silicon powder as a negative active material. The diameter of the silicon powder was checked with an electronic microscope, and the result was an average diameter of about 250 nm. However, the silicon powder had particles of about 0.9 μm. A Raman shift by Raman Spectroscopy showed a peak at about 490 $cm^{-1}$, and a full width at half-maximum of 40 $cm^{-1}$.

Comparative Example 2

Silicon powder with an average diameter of 1 μm was used as a negative active material. A Raman shift by Raman Spectroscopy showed a peak at about 520 $cm^{-1}$, and a full width at half-maximum of 9 $cm^{-1}$.

Fabrication of Lithium Cell 70 parts by weight of each of the negative active materials according to Example 1 and Comparative Examples 1 and 2, 20 parts by weight of a graphite powder with an average diameter of 2 μm as a conductive agent, and 10 parts by weight of a polyvinylidene fluoride binder were mixed in N-methyl pyrrolidone to prepare a slurry. The slurry was coated on a copper foil with a thickness of 14 μm and dried followed by pressing, thereby producing a negative electrode with a thickness of 80 μm. The negative electrode was cut in circles having a diameter of 13 mm. Each negative electrode was placed in a can with a polypropylene separator, the lithium metal counter electrode, and an electrolyte of 1 mole/L of $LiPF_6$ in a mixed solution of ethylene carbonate: dimethyl carbonate, and diethyl carbonate in a 3:3:1 volume ratio to fabricate coin-type lithium half cells.

Properties of Negative Active Material

The negative active material according to Example 1 had a particle diameter of 10 nm to 200 nm, whereas that according to Comparative Example 1 had an average particle diameter of about 250 nm which is larger than the diameter of Example 1, and had macro particles with a diameter of 0.9 μm which were not included in the negative active material according to Example 1.

Such differences in Example 1 and Comparative Example 1 are caused by the differences in the preparation thereof. According to the invention, negative active material particles with a smaller diameter and a narrower diameter distribution can be achieved than when silicon powder is obtained from mechanical pulverization of silicon macro powder. Mechanical pulverization tends to result in diameters of about 1 μm which causes the negative active material particles to form with large diameters and a wide diameter distribution.

The negative active material according to Example 1 exhibited a Raman Shift of 500 $cm^{-1}$, and a full width at half-maximum of 15 $cm^{-1}$ full which indicated that it is amorphous. That of Comparative Example 2 exhibited a Raman Shift of 520 $cm^{-1}$, and a full width at half-maximum of 9 $cm^{-1}$ full which indicated a relatively higher crystallinity than that according to Example 1. The negative active material according to Comparative Example 1 exhibited a Raman Shift of 490 $cm^{-1}$, and a full width at half-maximum of 40 $cm^{-1}$ full which indicated relatively lower crystallinity than that according to Example 1, and it was amorphous. The result according to Comparative Example 1 is considered to occur because mechanical pulverization causes distortion of the crystallinity of silicon.

Properties of Lithium Cell

The discharge capacity for 1 cycle (initial discharge capacity) and the discharge capacity retention at the 10$^{th}$ cycle compared to the discharge capacity at the 1st cycle are shown in Table 1.

TABLE 1

| | Discharge capacity (initial discharge capacity) (mAh/g) | Discharge capacity retention (%) |
|---|---|---|
| Example 1 | 1750 | 90 |
| Comparative Example 1 | 1870 | 68 |
| Comparative Example 2 | 2350 | 20 |

It is evident from Table 1 that the initial discharge capacity in Example 1 is lower than those of Comparative Examples 1 and 2, but the discharge capacity retention is higher than those in Comparative Examples 1 and 2. These results are believed to occur for a number of reasons.

The relatively low crystallinity of the negative active material according to Example 1 allows a reduced volume expansion of particles during charging, thereby preventing the deterioration of the battery, and the ultra-fine particles with a diameter of 200 nm or less have unique properties, that is, the size effect, compared to high-crystalline Si. Furthermore, the negative active material according to Example 1 has a different atomic coordination than the high-crystallinity Si because it is obtained from the coagulation of silicon vapor.

The negative active material for a rechargeable lithium battery according to the present invention includes ultra-fine particles obtained from evaporation under a gas atmosphere, and the ultra-fine particles have a narrow diameter distribution of 1 to 200 nm and a maximum diameter of 200 nm. Even though the ultra-fine particles alloy with lithium during charge and discharge, volume expansion does not occur. Thus, the negative active material exhibits good cycle life characteristics.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A negative active material for a rechargeable lithium battery consisting essentially of:
    ultra-fine particles of an element selected from the group consisting of Pb, Sn and Al, wherein each particle has a diameter between 1 nm and 200 nm, a Raman shift of 480 $cm^{-1}$ to 520 $cm^{-1}$ measured by Raman Spectroscopy, and a full width at half-maximum of 10 $cm^{-1}$ to 30 $cm^{-1}$.

2. The negative active material of claim 1, wherein the ultra-fine particles are prepared by evaporation under a gas atmosphere.

3. The negative active material of claim 1, wherein the ultra-fine particles are selected from the group consisting of isolated ultra-fine particles, linear-linked ultra-fine particles, agglomerated ultra-fine particles, and combinations thereof.

4. A rechargeable lithium battery comprising:
    a negative electrode comprising a negative active material consisting essentially of ultra-fine particles of an element selected from the group consisting of Pb, Sn and Al, wherein each particle has a diameter between 1 nm and 200 nm, a Raman shift of 480 $cm^{-1}$ to 520 $cm^{-1}$ measured by Raman Spectroscopy, and a full width at half-maximum of 10 $cm^{-1}$ to 30 $cm^{-1}$;
    a positive electrode comprising a positive active material; and
    an electrolyte.

5. The rechargeable lithium battery of claim 4, wherein the ultra-fine particles are prepared by evaporation under a gas atmosphere.

6. The rechargeable lithium battery of claim 4, wherein the ultra-fine particles are selected from the group consisting of isolated ultra-fine particles, linear-linked ultra-fine particles, agglomerated ultra-fine particles, and combinations thereof.

* * * * *

UNITED STATES PATENT AND TRADEMARK OFFICE
CERTIFICATE OF CORRECTION

| | |
|---|---|
| PATENT NO. | : 8,048,568 B2 |
| APPLICATION NO. | : 10/752297 |
| DATED | : November 1, 2011 |
| INVENTOR(S) | : Kyou-Yoon Sheem et al. |

It is certified that error appears in the above-identified patent and that said Letters Patent is hereby corrected as shown below:

On the Title Page

(75) Inventors, line 2.       Delete "Yokohama (JP)"
                              Insert -- Yokohama-shi (JP) --

(75) Inventors, line 3.       Delete "Yokohama (JP)"
                              Insert -- Yokohama-shi (JP) --

(75) Inventors, line 4.       Delete "Yokohama (JP)"
                              Insert -- Yokohama-shi (JP) --

(56) References Cited,        Delete "Yum"
page 2, right column,         Insert -- Yun --
Other Publications, line 7.

Signed and Sealed this
Sixth Day of November, 2012

David J. Kappos
*Director of the United States Patent and Trademark Office*